(No Model.)

W. BLAKELY.
HANDLE FOR BICYCLES.

No. 450,906. Patented Apr. 21, 1891.

Witnesses.
E. M. Clark
C. Sedgwick

Inventor
W. Blakely
by
Munn
Attorneys.

UNITED STATES PATENT OFFICE.

WILLIAM BLAKELY, OF VERNON, BOURNEMOUTH WEST, ENGLAND.

HANDLE FOR BICYCLES.

SPECIFICATION forming part of Letters Patent No. 450,906, dated April 21, 1891.

Application filed July 1, 1890. Serial No. 357,410. (No model.)

*To all whom it may concern:*

Be it known that I, WILLIAM BLAKELY, estate agent, of Vernon, Bournemouth West, in the county of Dorset, England, have invented a new and useful Improvement in Lever and other Handles, of which the following is a full, clear, and exact description.

My invention relates more particularly to the handles of bicycles and tricycles; and it has for its object to absorb or neutralize the jarring or tremulous motion which is ordinarily transmitted to the hands and arms of the rider when grasping the handles of the machine, and which is both disagreeable and injurious.

Reference is to be had to the accompanying drawings, forming part of this specification, wherein I have illustrated the invention as applied to a bicycle-handle.

Figure 1:
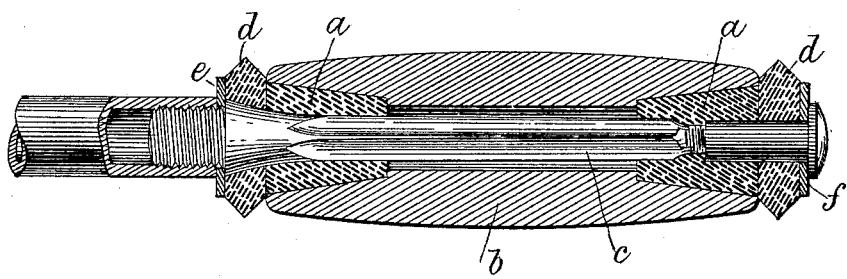
Figure 3:
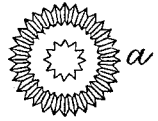
Figure 2:
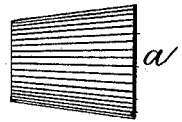

Figure 1 is a longitudinal section of the horn or other handle, showing the tang in elevation. Figs. 2 and 3 show side and end views of the bushings separately.

The invention consists in the employment of elastic bushings $a\, a$, of soft vulcanized india-rubber, in the form of truncated cones, and having their conical surfaces preferably fluted or ribbed in order to increase their elasticity, or they might be plain or be otherwise serrated. Said bushings $a$ are interposed between the handle $b$ and the tang $c$, on which it is fixed. The ends of the handle $b$ are coned out to receive the bushings, and the bore of the handle is so much larger than the tang that it will not bear thereon, but will be held only by its end bearings on the elastic bushings $a$, which thus act as cushions to prevent the transmission of vibrations from the tang to the handle. The tang is preferably of angular cross-section with its sides slightly hollowed, so as to present comparatively sharp angles to the bore of the bushings, which, by embedding in the soft rubber, prevent turning of the bushings and handle upon the tang; but the tang or spindle may be of any desired form.

$d$ are soft india-rubber disks, which may be applied against the outer ends of the bushings and handle, so as to more completely insulate the handle from the adjacent shoulders or nuts by which it is forced on the tang. The one washer abuts against a washer $e$ on the tang, and a metal washer $f$ and cap-nut are applied against the other and screwed up to compress the bushings $a$ in their conical seats, according to the degree of flexibility required. The elastic washers $d$ may be omitted, if preferred.

The bushings $a$ may, if desired, be built up of a number of disks of india-rubber of varying diameter assembled together on the tangs, so as together to form a coned bushing.

Although I have described my invention as applicable to cycle-handles, I would have it understood that it is applicable also to the handles of levers of all kinds of machines with equal advantage, in some cases serving both to prevent the transmission of heat to the hands, as well as to neutralize vibration.

Having now particularly described and ascertained the nature of the said invention and in what manner the same is to be performed, I declare that what I claim is—

1. An improved handle consisting of a tang, a body portion having a longitudinal bore of greater diameter than the diameter of the tang, and elastic and apertured bushings secured on the tang at the ends of the body portion, substantially as described.

2. In a lever or other handle, the combination, with the handle and its tang, of conical elastic bushings received in the ends of the handle so as to be interposed between the handle and its tang and isolate the handle from the tang, substantially as specified.

3. In a lever or other handle, the combination, with the handle and its tang, of elastic bushings of conical form received in conical recesses in the ends of the handle so as to be interposed between the handle and its tang and isolate the one from the other, the said bushings being compressible by end pressure, and elastic washers interposed between the ends of the handle and the abutments on the tang by which the handle and the bushings are held in place, substantially as specified.

4. In a lever or other handle, the combination, with the handle and its tang, of elastic bushings of fluted or ribbed conical form received in conical recesses in the ends of the handle so as to be interposed between the handle and its tang and isolate the one from the other, the said bushings being compressible by end pressure, and elastic washers interposed between the ends of the handle and the abutments on the tang by which the handle and bushings are held in place, substantially as specified.

The foregoing specification of my improvement in lever and other handles, signed by me this 1st day of April, 1890.

WILLIAM BLAKELY.

Witnesses:
 THOMAS LAKE,
 T. J. OSMAN,
*Clerks to Messrs. Scorer Harris, Notaries Public, 17 Gracechurch St., London.*